United States Patent

Miwa

[11] Patent Number: 5,184,832
[45] Date of Patent: * Feb. 9, 1993

[54] AERODYNAMIC MOTORCAR

[76] Inventor: Tsutomu Miwa, 3010-8, Sayamagaoka 1-chome, Tokorozawa-shi Saitama 359, Japan

[*] Notice: The portion of the term of this patent subsequent to Oct. 8, 2008 has been disclaimed.

[21] Appl. No.: 772,805

[22] Filed: Oct. 8, 1991

Related U.S. Application Data

[60] Continuation of Ser. No. 569,483, Aug. 20, 1990, Pat. No. 5,054,844, which is a continuation of Ser. No. 440,450, Nov. 22, 1989, abandoned, which is a continuation of Ser. No. 162,305, Feb. 29, 1988, abandoned, which is a division of Ser. No. 926,412, Oct. 7, 1986, abandoned.

[30] Foreign Application Priority Data

Dec. 7, 1984 [JP] Japan ............... 59-257479

[51] Int. Cl.$^5$ .......................................... B62D 35/00
[52] U.S. Cl. ................... 296/198; 296/180.1; 296/180.5; 296/208; 296/185; 280/848
[58] Field of Search .............. 296/198, 180.1, 180.5, 296/208, 185; 280/668, 848

[56] References Cited

U.S. PATENT DOCUMENTS

| | | | |
|---|---|---|---|
| 1,871,396 | 8/1932 | Stalker | 296/180.1 |
| 2,725,944 | 12/1955 | Lee et al. | 296/180.1 X |
| 2,886,120 | 5/1959 | Broell | 180/68.1 |
| 2,888,274 | 5/1959 | Premo | 296/208 X |
| 3,064,747 | 11/1962 | Barenyi | 296/208 X |
| 3,618,998 | 11/1971 | Swauger | 296/61 |
| 3,776,587 | 12/1973 | Oxlade | 296/180.5 |
| 3,791,468 | 2/1974 | Bryan, Jr. | 296/180.1 X |
| 3,869,166 | 3/1975 | Burst et al. | 296/180.1 X |
| 3,917,332 | 11/1975 | Puleo | 296/901 X |
| 4,006,931 | 2/1977 | Groves | 296/180.3 |
| 4,029,350 | 6/1977 | Goupy et al. | 293/110 |
| 4,131,308 | 12/1978 | Holka et al. | 296/180.5 |
| 4,159,140 | 6/1979 | Chabot et al. | 296/180.5 |
| 4,379,582 | 4/1983 | Miwa | 296/180.5 |
| 4,549,762 | 10/1985 | Burk et al. | 296/208 |
| 4,690,204 | 9/1987 | Reichel et al. | 180/68.1 |
| 5,054,844 | 10/1991 | Miwa | 296/198 |

FOREIGN PATENT DOCUMENTS

| | | | |
|---|---|---|---|
| 64274 | 2/1946 | Denmark. | |
| 912663 | 5/1954 | Fed. Rep. of Germany. | |
| 1138365 | 1/1957 | France | 180/68.1 |
| 500186 | 11/1954 | Italy. | |
| 503910 | 12/1954 | Italy. | |
| 503639 | 1/1956 | Italy | 180/68.1 |
| 623498 | 5/1949 | United Kingdom | 180/68.1 |
| 2076762 | 12/1981 | United Kingdom | 296/198 |

Primary Examiner—Dennis H. Pedder
Attorney, Agent, or Firm—Lowe, Price, LeBlanc & Becker

[57] ABSTRACT

The present invention provides an automobile which offers air resistance and lift which are lower than those for a conventional automobile, yet which is hardly changed in its external appearance. The reducing means includes over each front wheel 19 an air passage 4 formed as a hollow 1 made by recessing a body panel located above the wheel, the air passage 4 having an air inlet 2 at its front and an air outlet 3 at its rear. Air current flows smoothly through the hollow 1 located above the front wheel to the air outlet 3 which is on the same level at or located at a higher position than the air inlet 2, thereby reducing air resistance and lift to levels which are lower than those for the conventional automobile. In one aspect of the invention, the air passage 4 is covered by a bonnet 16, other outer shell portions, and a pivotally secured reverse lift plate 5 or a reverse lift member 12 is included. The reverse lift plate 5 or the reverse lift member 12 is made flush with the surrounding outer shell and is provided in such a manner that it does not represent an unsightly appendage which would change the appearance of the conventional automobile. In another aspect of the invention comparable air passages and reverse lift members are provided over each of the rear wheels as well, to further reduce the air resistance and to improve the stability of the vehicle during motion and when exposed to side winds.

24 Claims, 8 Drawing Sheets

AERODYNAMIC MOTORCAR

This application is a continuation of application Ser. No. 07/569,483, filed Aug. 20, 1990, now U.S. Pat. No. 5,054,844, issued Oct. 8, 1991, which is a continuation of Ser. No. 07/440,450, filed Nov. 22, 1989, now abandoned; which is a continuation of Ser. No. 07/162,305, filed Feb. 29, 1988, now abandoned; which is a divisional of 06/926,412, filed Oct. 7, 1986, now abandoned.

TECHNICAL FIELD

The present invention relates to a system for improving the aerodynamic characteristics of a motorcar including decrease in air resistance and lift by providing the motorcar with an air passage above its wheel through which air passes from the front to the rear of the motorcar, a part of the air passage being provided with a reverse lift member.

BACKGROUND ART

Recently, it is common to take into consideration the potential for reduction in the air resistance and lift of a motorcar when modifying the external form thereof. However, a motorcar has never been manufactured in which the visible external form is independent of the external form presented to the wind, or which invisibly incorporates in the visible car body a subsidiary car body with an aerodynamic design which is smaller at its front and rear portions than that of the visible car body. More specifically, there is no prior art which enables the aerodynamic car body to be incorporated in the visible car body. It is also unknown to treat in the aerodynamically most suitable manner a car's wheels and the wheel space which can be the main barrier to achieving reduction in the air resistance of the car.

The present invention resides in transforming the space in which the wheel moves up and down into an air passage through which air can pass smoothly, and aims at the provision of an aerodynamically efficient car body which is able to offer reduced air resistance and lift.

DISCLOSURE OF INVENTION

The aerodynamic motorcar of the present invention includes an air passage provided over the wheel through which the current of oncoming air passes smoothly from the front to the rear of the motorcar, said air passage having the air inlet and the air outlet, a part of the air outlet being provided with air guide plates or a reverse lift plate thereby achieving reduction in the air resistance and lift of the car, while the reverse lift plate being provided in such a manner that the reverse lift plate and the nearby outer shell of the body are not remarkably different in level achieving a harmony with the normal external appearance of the motorcar.

BRIEF DESCRIPTION OF DRAWINGS

FIGS. 1 to 6, apart from the lower half of FIG. 4, left half of FIG. 5 and left half of FIG. 6 which show a conventional motorcar, are illustrations of a first embodiment of the present invention in which:

FIGS. 7 to 10 show a second embodiment of the present invention in which:

FIGS. 11 to 15 show a third embodiment of the present invention in which:

BEST MODE FOR CARRYING OUT THE INVENTION

Embodiments of the present invention will be described with reference to the accompanying drawings.

Figure 1:
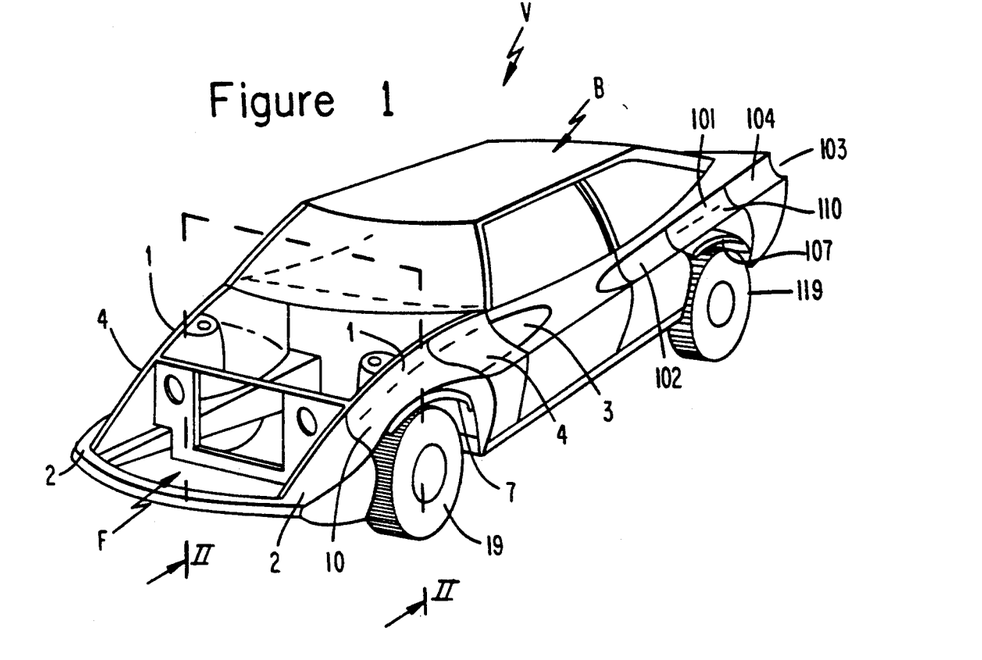
FIG. 1 is a perspective view of the body of a motorcar to which the present invention is applied.

FIG. 1 is a perspective view of an aerodynamic motorcar, showing a first embodiment of the present invention in the flame of the body, the engine and other auxiliary devices being omitted.

In the drawing, the solid panel composed of such as iron plate which is positioned above the wheel is cut away to provide a hollow 1 formed thereat. The height of a wheel housing panel can be made slightly larger than that of the wheel by providing a hollow 1 on the wheel housing panel which encloses the wheel. In other words, the height of the wheel housing panel can be made far lower than that of a conventional car in which there is a large space above the wheel. This can cause air to pass horizontally immediately above the wheels through the hollow 1.

At the front and the rear of the hollow 1, the air inlet 2 and the air outlet 3 are provided, and the intermediate portion between the inlet 2 and the outlet 3 can be transformed into an air passage 4, thereby enabling the current of oncoming air to flow smoothly a few centimeters above the wheel.

A wheel cover 10 made of resilient material such as synthetic rubber or the like is provided over, in front of and at the rear of the wheel 19 to separate the air current into two portions, flowing in the wheel house panel and in the air passage 4, respectively.

This allows the current of oncoming air flowing in the hollow 1 positioned immediately above the wheel 19 not to be affected by a turbulent flow generated in the wheel house by the rotation of the wheel and to take the form of an ideal laminar flow.

In other words, in designing the upper half of a car body except for the window area, it is possible to narrow the front and rear portions thereof to a large degree enabling the design of an aerodynamically ideal car body, and its manufacture can realize the car.

Figure 2:
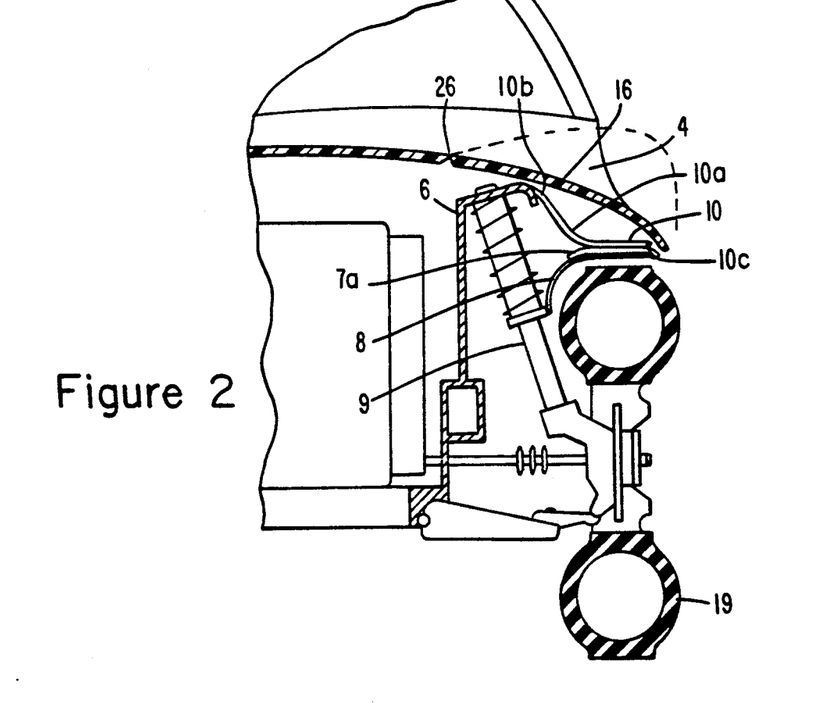
FIG. 2 is a section taken along the line A—A of FIG. 1.

Referring to FIG. 2 which is a sectional view taken along the line A—A of FIG. 1 and seen from the front of the car, upper and lower stays 8 are secured at their lower portion to a lower spring member 9 of an suspension system, and are mounted at their upper end in an upper interlocking member 7.

When the wheel 19 is thrust upwardly, the upper interlocking member 7 and the upper and lower stay 8 are pushed up by the lower spring member 9. However, the upper half of the wheel 19 is kept under the cover, thanks to the expansion of the wheel cover 10 made of flexible material which is secured to the wheel housing panel 6 forwardly and rearwardly of the wheel 19.

If the outer sheel of the side panel 20 or a bonnet 16 is made of a resilient material to cope with the upward thrusting of the upper interlocking member 7, it can be provided at a position as low as just several centimeters above the wheel 19. In such a case, it is not necessary to make the entire bonnet flexible. Only the bending portion 26 of the bonnet, for example, need to be made of resilient material.

In FIG. 2, the dotted line representing the line of the bonnet or the side panel above the wheel 19 shows the position of the outer sheel of the conventional car. The solid line indicates that of the first embodiment of this invention.

Figure 3:
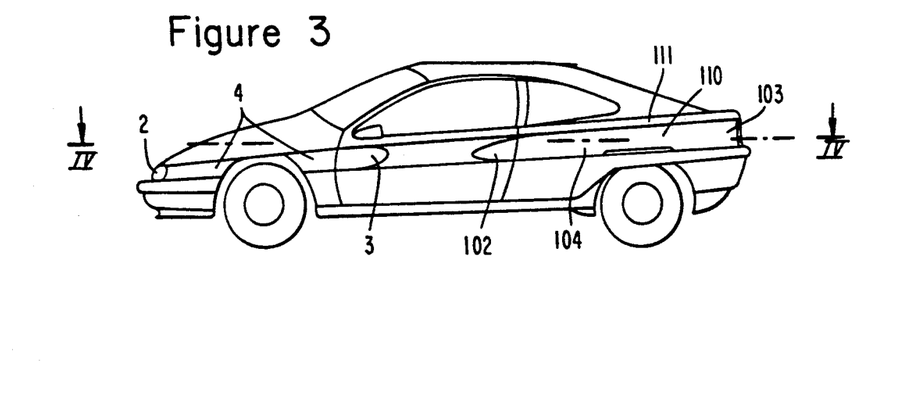
FIG. 3 is a side elevational view.

FIG. 3 is a side elevational view of the external form of a high-powered car to which this invention is applied. A long recessed portion is provided above each rear wheel in such a manner as to extend from the door to the rear of the car. The front of this recess forms the air inlet 2, whereas the recessed portion and the rearmost portion respectively represent the air passage 4 and the air outlet 3. Since the air current flows on the side surface of the car body toward a portion which makes lower atmospheric pressure, the air current flowing around the recess and along the side surface of the car body flows into the recessed air passage 4, and flows out from the rearmost portion of the recess, i.e., the air outlet 3 where the atmospheric pressure is lowest.

The air current flowing in this recessed air passage 4 in this embodiment makes a quite different configuration from that of the conventional car when seen from above.

Figure 4:
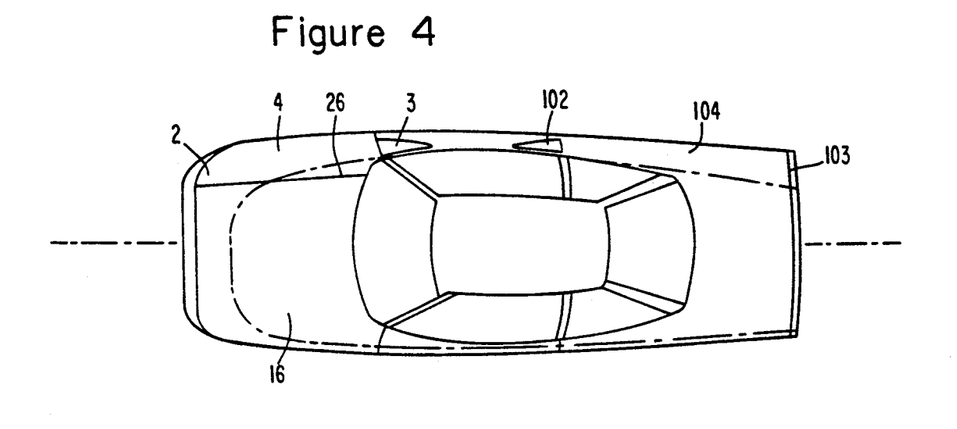
FIG. 4 is a top view.

FIG. 4 is a top view of a motorcar, in which the upper half thereof shows the car to which this invention is applied and the lower half relates to a conventional car.

The dotted line in FIG. 4 shows the configuration of the outer shell of the car body as seen from above which is taken along the line A—A of FIG. 3.

It is apparent that the configuration of the air current flowing along the outer shell of the side of the car body shown in the upper half is quite different from that in the conventional car shown in the lower half.

In the side view of FIG. 3, the configuration of the air current of the car of the present invention looks the same as that of the conventional car. However, it becomes quite different from that of the known car with respect to the air passage 4 formed in the recess in the upper half of the car body shown in FIG. 4 taken along the line A—A of FIG. 3.

More specifically, in the upper half of FIG. 4, the rear portion of the car body is narrowed extensively by the recess provided over the rear wheel which is shown in FIG. 3.

Figure 5:
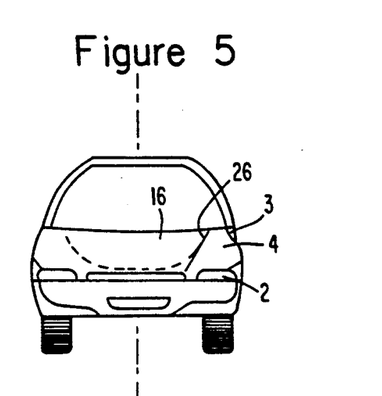
FIG. 5 is a front view.

FIG. 5 is a front view of a car, in which the right half illustrates the car to which the present invention is applied and which is shown in FIGS. 3 and 4, while the left half represents the conventional car.

In the right half of FIG. 5, the shoulder of the large-sized bonnet which extends above the front wheel is hollowed out, whereas in the left half the bonnet is rounded because of the space incorporated therein in which the wheel moves up and down.

The configuration of the air flow through the very low passage provided above the front wheel in the car of the present invention is quite different from that of the conventional car in which the air passes over a large space occupied by the suspension system of the front wheel.

Figure 6:
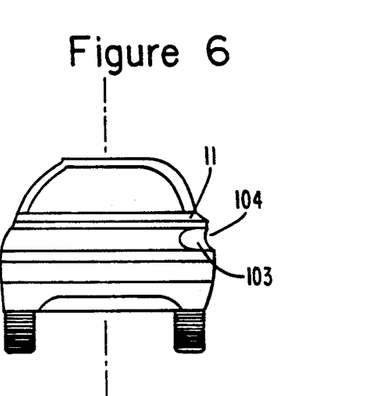
FIG. 6 is a rear view

FIG. 6 is a rear view of a car, in which the right half illustrates the car of the present invention and the left half shows the conventional car. In the right half of FIG. 6, the air outlet 3, i.e., the rear end of the air passage 4 which represents a recess on the side of the car body allows the aerodynamic car body to be made narrower at its rear end. The portion overhanging the air outlet 3 which is represented by the recess on the rear of the car body constitutes a rear wing 11. This forms the upper surface of the air passage 4. As shown in FIG. 3, the rear wing 11 gently slopes upward from above the rear wheel toward the rear of the car.

In consequence, the rear wing 11 causes reverse lift to be generated by directing the current of oncoming air slightly upward and causing it to flow out in an obliquely upper and rearward direction, thereby increasing the tendency of the rear wheels to stay on the ground. This can prevent a sharp heel of the car by means of the action of the air current.

The rear wing 11 also prevents the air stream flowing down by the roof and the air stream flowing up by the side of the car body from interfering with each other. In the conventional car, the rear of the car body is sucked backward by von Karman's vortex street which is generated as a result of interference between these air currents, thereby increasing the air resistance. The occurrence of von Karman's vortex street can be prevented by this rear wing 11 which acts to separate these two air currents.

Part of the rear of the rear wing 11 is cut off and pivotally supported so as to be transformed into a reverse lift plate 5 which has a lowered front end and a raised rear end.

Figure 8:
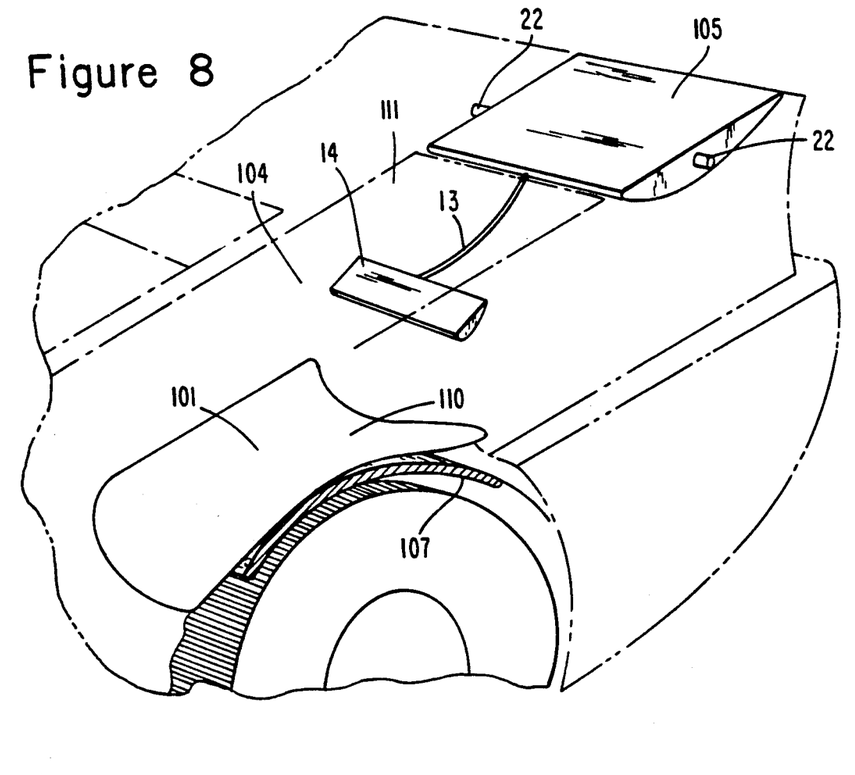
FIG. 8 is a perspective view showing the interior without the outer shell.
Figure 9:
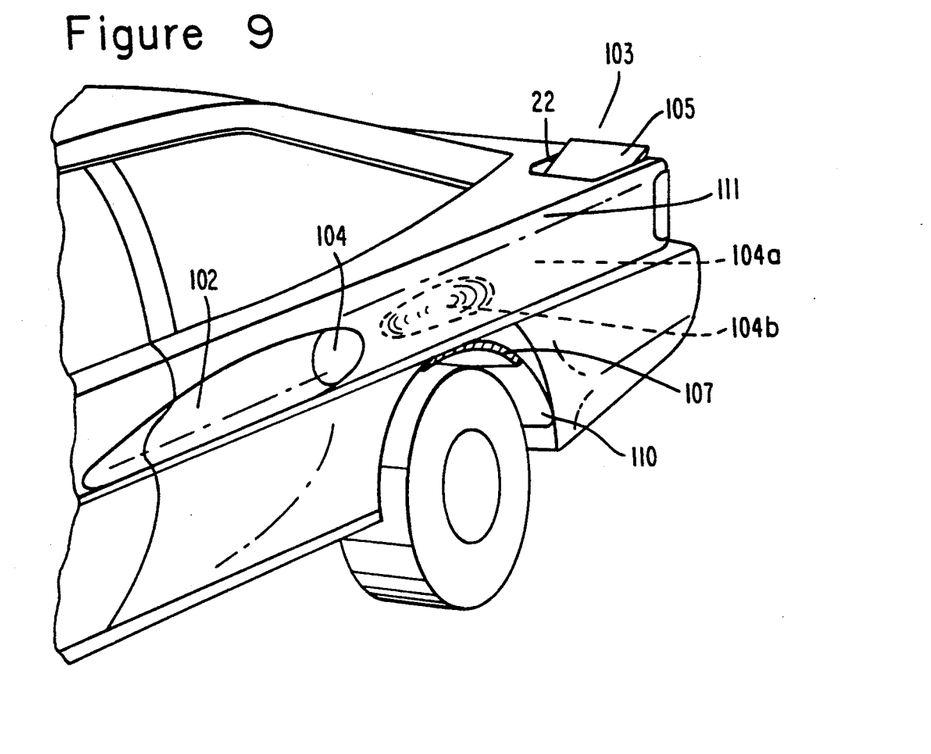
FIG. 9 is a perspective view of the external view.

FIGS. 8 and 9 show the opening/closing mechanism of the reverse lift plate 5 which utilizes wind pressure.

Figure 7:
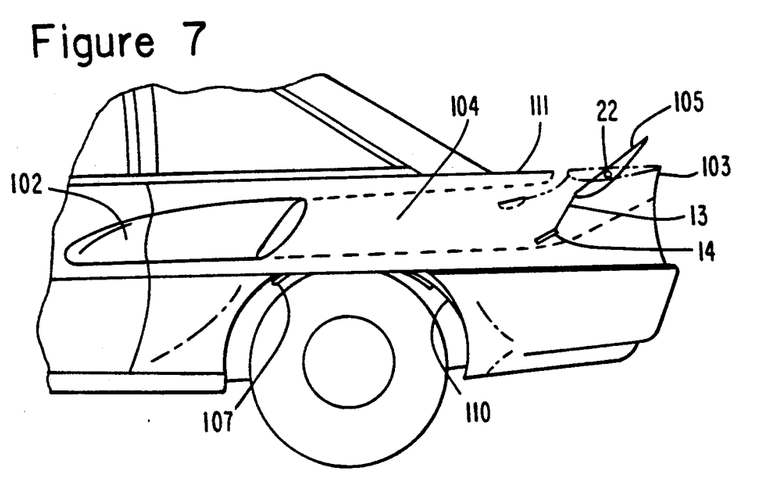
FIG. 7 is a side elevational view.

FIG. 7 is a side view of the reverse lift plate 5 turnably supported on the rear of the rear wing 11. The solid line shows it in the state wherein it is opened, while the dotted line shows a closed plate 5.

FIG. 8 is an enlarged perspective view of the reverse lift plate 5. When it is closed, the upper surface of the reverse lift plate 5 is flush with the rear wing 11, thus ensuring that the plate 5 does not represent an unsightly appendage which would harm the appearance of the car.

As shown in FIGS. 7 and 8, a reverse lift guide 14 is secured to the distal end of a guide stay 13 which protrudes downwardly from the front end of the reverse lift plate 5 in a slanting fashion, the reverse lift guide 14 being slanted such that its front edge is positioned lower than the rear edge.

As the amount of air flowing through the air passage 4 increases, the reverse lift effect acting on the reverse lift guide 14 becomes larger than the gravity or the force of a spring which normally acts to keep the reverse lift plate 5 flat.

In consequence, the reverse lift guide 14 is lowered, and the reverse lift plate 5 is raised at its rear end, thereby causing the air current to be directed upward and the reverse lift to be increased. As the reverse lift guide 14 is lowered down to the bottom surface of the air passage 4, the angle of inclination made by the rear end of the air passage 4 becomes very large relative to its bottom surface, causing the air to flow further upward and the reverse lift effect to be further increased.

The car will have the tendency to lean toward the downwind side thereby raised higher with the other side when subjected to a strong side wind or when making a turn. This undesirable tendency can be prevented to some extent by the action of the reverse lift acting on the reverse lift plate 5 in proportion to the amount of air flowing through the air passage 4.

The car body receives more air flow on its windward side when it receives the side wind or on the side which represents the inner side in terms of the turning direction when making a turn, causing a larger amount of air to flow through the air passage 4 on that side.

This causes the air passage 4 located at the windward side or the inner side to be affected by a larger amount of reverse lift than that applied to the other side.

In consequence, the windward side or the inner side of the car body which is easily raised is pushed downward by the action of the reverse lift, thus ensuring safe driving.

With this reverse lift guide 14 provided, the side of the air passage 4 must be covered by the outer shell, thereby making the passage 4 cylindrical.

FIG. 9 is a perspective view of the embodiment in which the side of the air passage 4 is covered so that the guide stay 13 and the reverse lift guide 14 are hidden by the outer shell.

In the embodiment shown in FIG. 9, the air inlet 2 provided on the side surface of the car body looks like the air inlet for the radiator of a known high-powered car in which the engine is located near the rear wheels, and it does not harm the appearance of the car shown in this embodiment.

In the car of this embodiment, however, the rear of the car body presented to the wind is extensively narrowed, thereby constituting an aerodynamic car body which is smaller than the visible car body. Only the visible car body which encloses the subsidiary car body with an aerodynamic design is similar to that of the known car.

Figure 10:
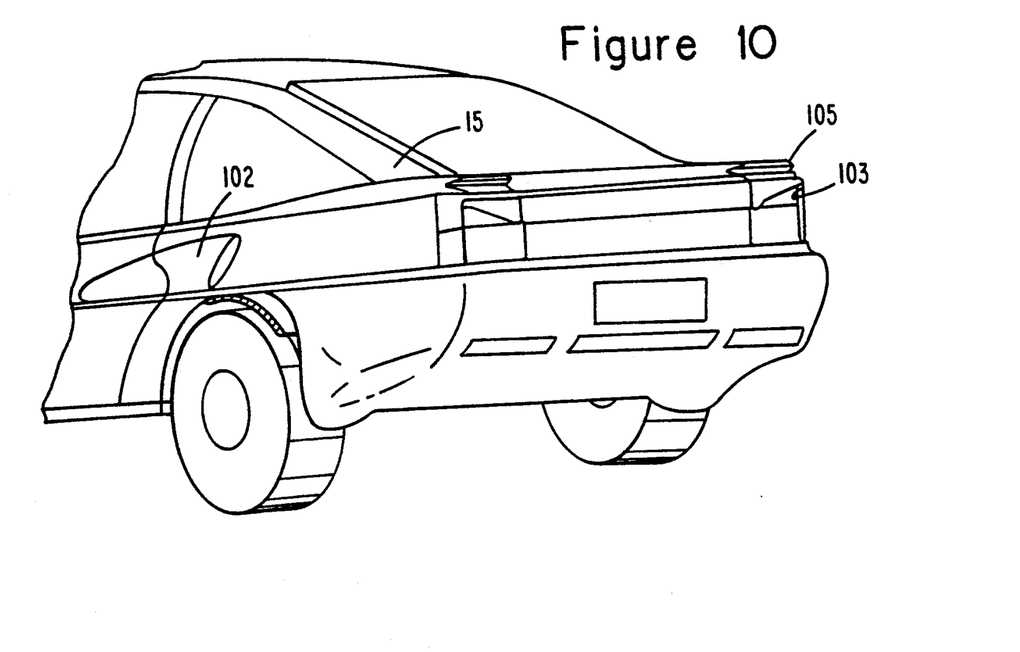
FIG. 10 is a perspective view of the rear.

FIG. 10 is a perspective view of the rear of the embodiment shown in FIG. 9. The rear of the aerodynamic car body which is constituted by the inner surfaces of the air passages 4 is narrowed extensively, the narrowing starting at the central portion of the car body, thereby reducing the air resistance.

The visible car body including the rear wing 11, however, looks the same as that of the known car.

In the car of this embodiment, the air passage 4 is provided by utilizing the space between the rear wheel housing and the trunk compartment. This makes the capacity of the trunk compartment smaller. Even in the trunk compartment of the known car, however, the portion of the trunk compartment into which the wheel housing extends and the portion to the rear thereof are seldom used. In this invention, since the air passage 4 is provided in that part of the trunk compartment which is least used, it does not lead to any inconvenience. The inner wall of the trunk room, except for the portion thereof which covers the space occupied by the suspension system, may be made of a resilient material, so that, if a large amount of luggage is carried, the air passage 4 may be closed.

Figure 11:
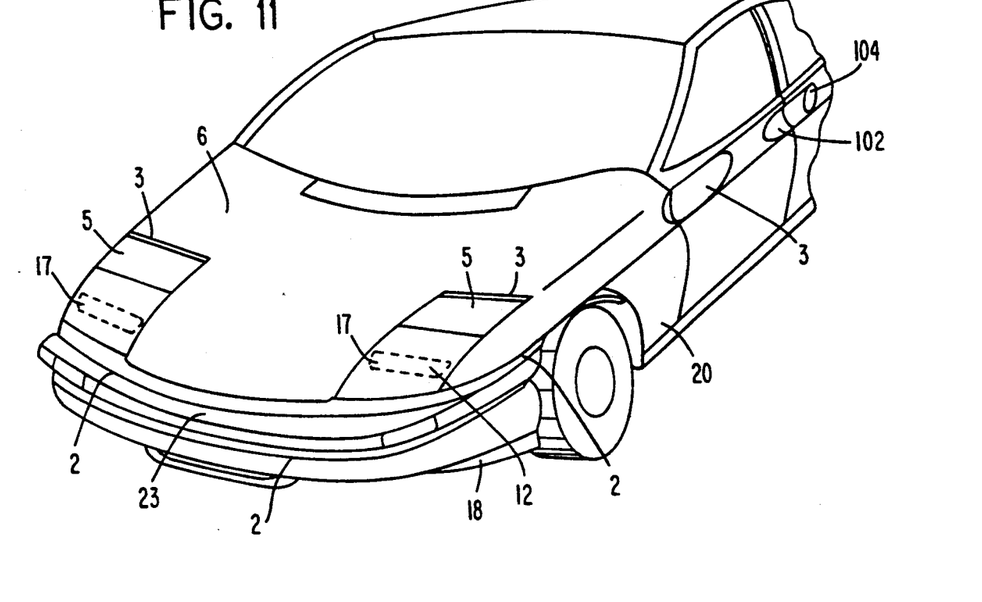
FIG. 11 is a perspective view.

FIGS. 11 to 15 illustrate a third embodiment of the present invention, of which FIG. 11 is a perspective view of an aerodynamic car in which a long air inlet 2 is provided on each side of the car body by utilizing the portion where the bonnet 16 and the side panel 20 meet in such a manner as to extend from the front to the side of the car body. The reverse lift plate 5 is pivotally supported at the air outlet 3 provided on the bonnet 16. The long air passage 4 is provided under the bonnet 16, thereby constituting an aerodynamically ideal car body which is smaller in size and which is hidden within the visible car body. A recess is provided at the front of the door to form the air outlet 3 on the side of the car body between the rear ends of the bonnet 16 and the side panel 20.

Figure 12:
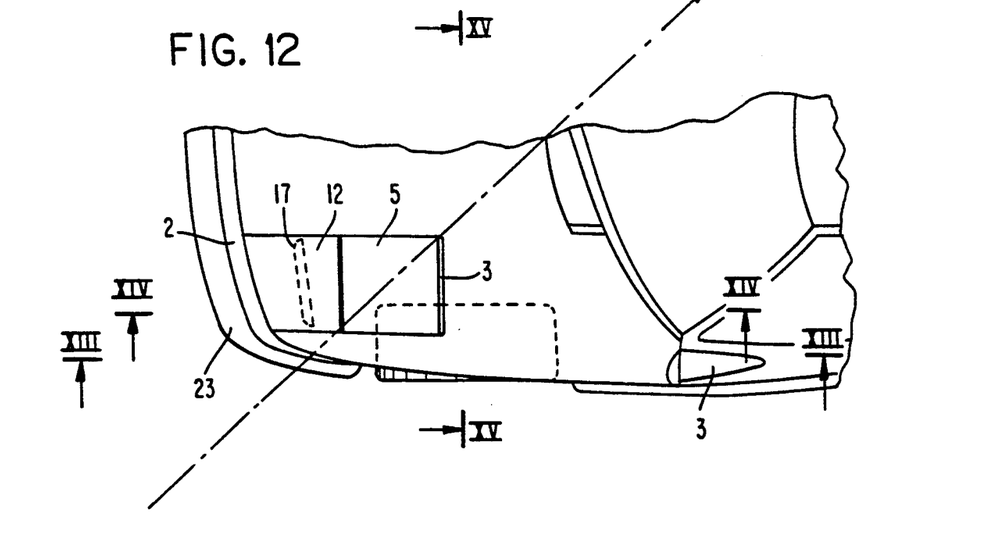
FIG. 12 is a top view.

FIG. 12 is a top view of the left half of the embodiment shown in FIG. 11, showing how the large-sized bonnet 16, the air outlet 3, the reverse lift plate 5 and the front wheel are positioned relative to each other. The car body presented to the wind is extensively hollowed out in front of the portion thereof where the suspension space for the front wheel is positioned, so as to provide the air passage 4.

Figure 13:
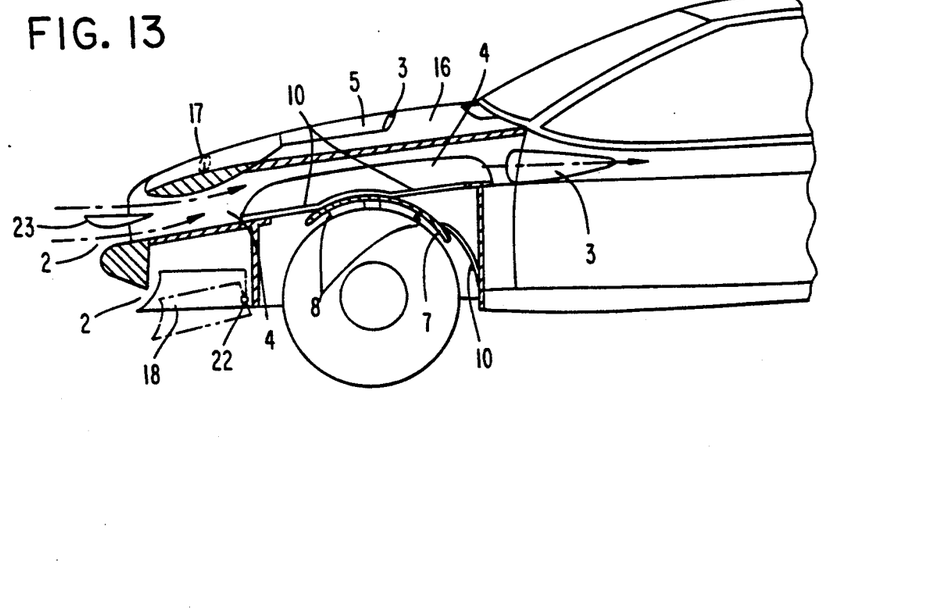
FIG. 13 is a side sectional view taken along the line A—A of FIG. 12.

FIG. 13 is a side sectional view taken along the line A—A of FIG. 12 which runs through the center of the wheel in the longitudinal direction, showing the air passage provided above and on the outer side of the wheel.

In this embodiment, the air stream formed when the car is running straight ahead flows in along the upper and lower surfaces of a reverse lift bumper 23 positioned above a main bumper 27, passes through the air passage 4 located above and close to the wheel 19, and flows out from the air outlet 3 provided at the front of the door to the side of the car body.

Figure 14:
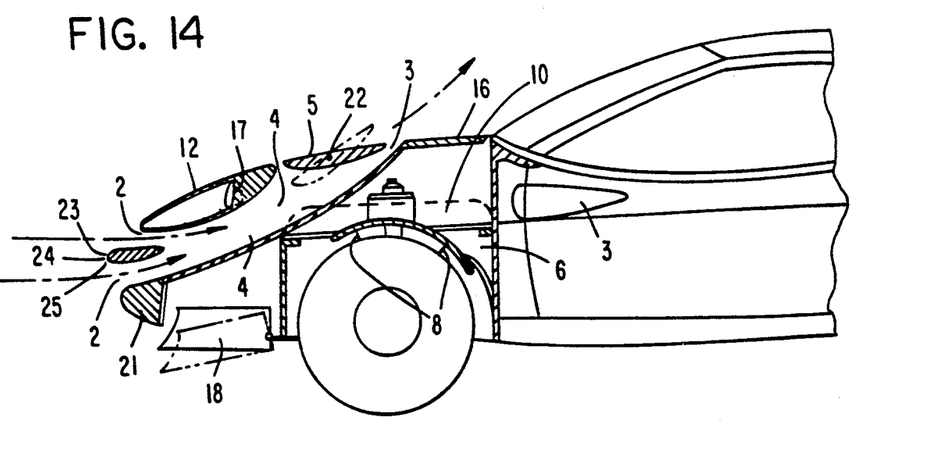
FIG. 14 is a side sectional view taken along the line B—B of FIG. 12.

FIG. 14 is a side sectional view taken along the line B—B of FIG. 12, showing the air passage 4 provided above and inner side of the wheel.

Similar to the flow shown in FIG. 13, the air stream flows into the air passage 4 along the upper and lower surfaces of the reverse lift bumper 23 while generating reverse lift, since the rate of flow at the upper surface is smaller than that at the lower surface and the atmospheric pressure at its upper surface is larger than that at its lower surface.

Above this air stream, another air stream flows into the air passage 4 along the upper and lower surfaces of a reverse lift member 12 in which headlight 17 is incorporated. The air stream which passes along the lower surface of this headlight flows out over the bonnet 14, while lowering the front end of the reverse lift plate 5 pivotally secured at the air outlet 3 on the bonnet and raising the rear end thereof. The air stream which flows along the upper surfaces of the reverse lift member 12 and the reverse lift plate 5 flows at a smaller speed and has a greater atmospheric pressure than that flowing along the lower surfaces, thereby causing the front ends of the reverse lift member 12 and the reverse lift plate 5 to be lowered further than their rear ends and causing reverse lift to act on the reverse lift member 12 and the reverse lift plate 5. In consequence, the car body is pushed downward, ensuring safe running.

The reverse lift generated by this reverse lift system does not act equally on the right and left sides of the car body. When the car is subjected to a strong side wind or when making a turn, the windward side of the car body receives a larger wind pressure than the downwind side, causing the car body to lean with its downwind side lower and thereby making the running unstable. In the car of this embodiment, air flows only in the air passage 4 located at the windward side, generating a large reverse lift. In consequence, the tendency to stay on the ground is increased only with respect to the wheels located on the side which is apt to be raised, thereby ensuring safe driving.

The air passage 4 shown in FIG. 14 is provided above the wheel so that it avoids the suspension system for the front wheel and the space which it occupies.

Figure 15:
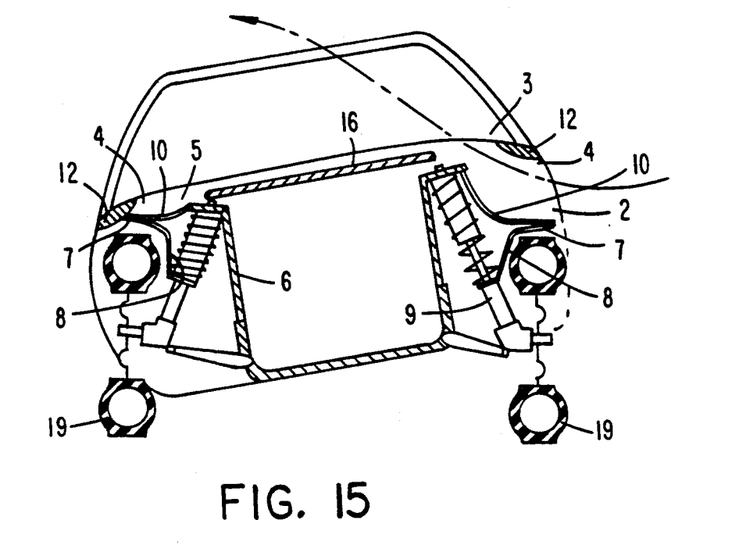
FIG. 15 is a front sectional view taken along the line C—C of FIG. 12.

FIG. 15 is a section taken along the line C—C of FIG. 12 and seen from its front side, showing a car making a left turn with wind blowing toward it obliquely from the front left hand side as shown by the dotted line of FIG. 12. When the car body leans over by virtue of the centrifugal force generated by the action of turning and the wheel is simultaneously thrust upward, the upper interlocking member 7 secured to the lower spring member 9 is raised, and the wheel cover 10 is also raised, thereby almost closing the air passage 4 located on the outer side in terms of the turning direction. Since the air passage 4 located at the outer side is thus closed, almost no reverse lift is generated.

In consequence, large reverse lift acts only on the windward side, and this can to some extent prevent the car from leaning toward the downwind side, this tendency being caused by the inertia force generated at the time of making a turn.

Figure 16:
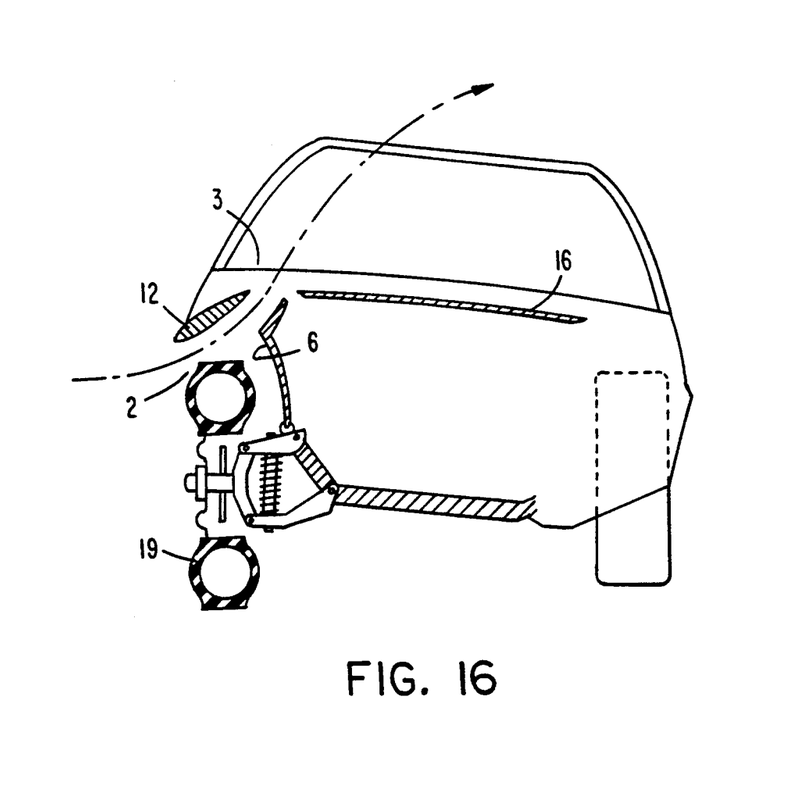
FIG. 16 is a front sectional view taken along the front wheel shaft, showing a fourth embodiment of the present invention.

FIG. 16 is a front and sectional view of a fourth embodiment of the present invention. In this embodiment, the front wing constitutes the reverse lift member 12. The wheel cover 10, the upper interlocking member 7 and the upper and lower stays 8 are not provided. If the suspension system is not located immediately under the bonnet 16, the air outlet 3 can be provided at any position on the bonnet 16.

In this embodiment, the air passage 4 located at the outer side in terms of the turning direction becomes closed when the car makes a turn. However, a smaller amount of reverse lift occurs on the inner side, because smooth air flow is not available without the wheel cover 10.

In the fourth embodiment, any type of suspension system may be employed. This can be carried out with the same level of production cost as with a conventional car.

Figure 17:
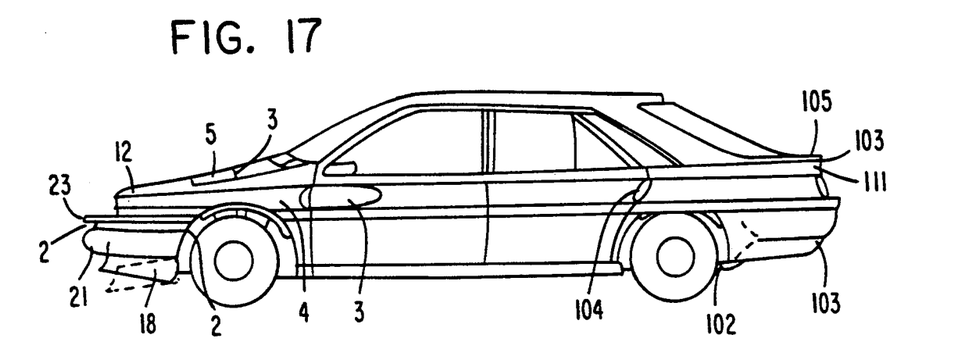
FIG. 17 is a side elevational view of a fifth embodiment of the present invention.
Figure 18:
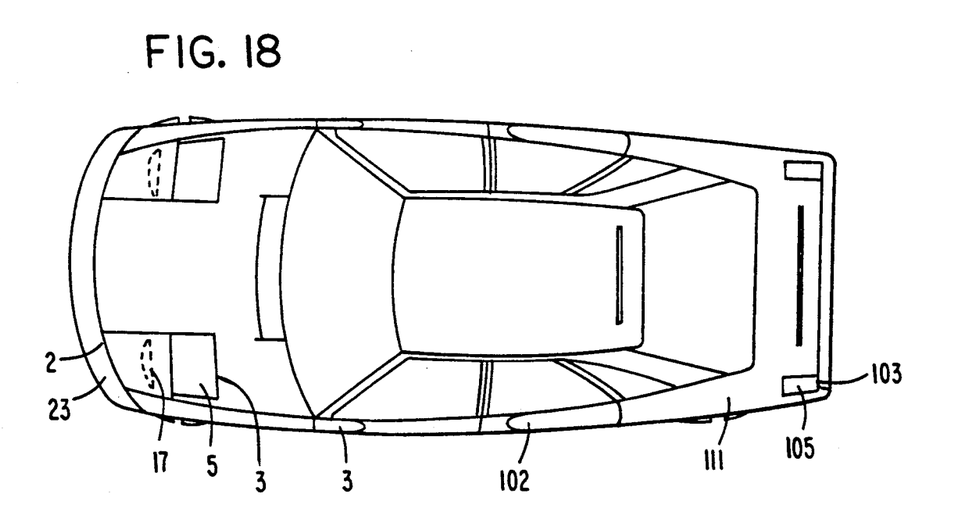
FIG. 18 is a top view of FIG. 17.

FIG. 17 is a side elevational view of a fifth embodiment of the present invention, showing a 4-door sedan to which this invention is applied. FIG. 18 is a top view thereof.

The surface area of the car body with which the air current makes contact can be increased by several percent by means of the air passage 4 provided at various positions within the car body. The resistance caused by the friction of air is correspondingly increased. However, the frictional drag occupies only 5 to 7 percent of the air resistance occurring on the car, and the remaining 95 to 93 percent represents the profile drag.

In this invention, it is possible to reduce to a great degree the profile drag which normally occupies 95 to 97 percent of the air resistance by the provision of a aerodynamic car body which is narrower at its front and rear portions. The reduction in profile drag is far greater than the increase in frictional drag.

As a whole, the air resistance generated on the car can be greatly reduced with the aerodynamically smaller car body of this invention.

It has heretofore been known to reduce the size of wheels and the space occupied by the suspension system and thereby to make the front and rear of the car body narrower in order to reduce air resistance.

In this invention, it is possible to employ a large-sized wheel and to provide a large space for the suspension system in an aerodynamic car body which is narrower at its front and rear ends.

The fact that large-sized wheels and a larger space for the suspension system are allowed leads to an increased tendency for the wheels to stay on the ground and allows for a comfortable ride. Also, stable running is made possible by the reverse lift generated when the car is subjected to a side wind or when it makes a turn.

Industrial Applicability

As will be understood from the foregoing description, the aerodynamic motorcar of the present invention makes it possible for fuel cost to be cut by reducing the air resistance experienced by a car. Stable driving is also ensured by increasing reverse lift when the car is running at high-speeds or is making a turn. These effects can be realized without modification of the essentially rectangular external form of the car body which thus looks the same as that of a conventional car, allowing the present invention to be applied to ordinary passenger cars.

Motorcars have previously been aerodynamically improved. However, the main barrier to achieving reductions in air resistance represents the wheels and the space for the suspension system, as well as the fixed idea about the appearance of a car body which is held by ordinary people. The present invention makes it possible to provide an aerodynamically ideal motorcar without changing the external form of the conventional car.

The present invention can be carried out at a low production cost, since it does not employ any greater proportion of expensive outer shell than does the conventional car.

What is claimed is:

1. In a vehicle having a plurality of front and rear wheels supporting a vehicle body frame to which is mounted a body shell defining a vehicle exterior, each wheel being disposed within a wheel housing defined between the vehicle body frame and the body shell, the improvement comprising:

a wheel cover means extending within at least one of the housings above the corresponding wheel therein, wherein said wheel cover means defines an air passage established in part by an upper surface of the wheel cover means and extending in a longitudinal direction of the vehicle directly above the wheel, said air passage including an air inlet and an air outlet respectively disposed forwardly and rearwardly of the associated wheel, said wheel cover means comprising a thin sheet of a flexible and resilient material secured at one portion thereof to the wheel housing and mounted at another portion on an element supported by a spring support means capable of at least upward movement related to upward movement of a corresponding said wheel which is rotatably connected to said spring support means, said air passage thereby having an inlet and an outlet and a cross-section that varies with at least the upward movement of the corresponding wheel, transmitted via said spring support means and element, which causes a deformation of the flexible and resilient sheet.

2. The vehicle according to claim 1, wherein a portion of said body shell located over and around said air passage is made of a resilient material.

3. The vehicle according to claim 1, wherein said wheel cover means separates an air current flowing longitudinally of said vehicle during motion thereof into two portions, a first portion flowing beneath the wheel cover means and around the wheel turbulent manner and a second portion flowing above the wheel cover means in said air passage in a relatively less turbulent manner, whereby an associated wind resistance force on the vehicle is reduced.

4. The vehicle according to claim 1, wherein said wheel housing is defined by a panel extending within the body shell to enclose said corresponding wheel, said wheel cover means being secured to the panel.

5. The vehicle according to claim 1, wherein said wheel housing is defined by a panel extending with respect to the body shell to partially enclose said corresponding wheel, said wheel cover means being secured to the panel.

6. The vehicle according to claim 1, further comprising:

a reverse lift plate, having a leading edge portion and a trailing edge portion, pivotally secured to an inner surface of said air passage, whereby said reverse lift plate has an operational position in which said trailing edge portion thereof is disposed higher than said leading edge portion thereof, said disposition causing the air flow through the passage to generate a downward force on said reverse lift plate.

7. The vehicle according to claim 6, wherein said reverse lift plate has an exterior surface movable into a rest position which is substantially contiguous with an adjacent outer surface portion of the body shell.

8. The vehicle according to claim 1, wherein a portion of the air passage extends along a trunk compartment of the vehicle and comprises a resilient material that is deformable when luggage in the trunk compartment is placed thereagainst.

9. The vehicle according to claim 2, wherein a portion of the air passage extends along a trunk compartment of the vehicle and comprises a resilient material that is deformable when luggage in the trunk compartment is placed thereagainst.

10. The vehicle according to claim 1, wherein said vehicle body shell in conjunction with said air passage defines an inner aerodynamic car body located inwardly of the vehicle exterior whereby conveyance of a relatively smooth flow of air is obtained past said inner aerodynamic body and an air resistance force experienced by said vehicle is reduced.

11. The vehicle according to claim 10, wherein said air passage defines a rear portion of the aerodynamic car body, which rear portion tapers in the rearward direction of the vehicle.

12. The vehicle according to claim 1, wherein said air passage is separated from said corresponding wheels by the wheel cover means, and an upper extent of said air passage is defined by a portion of said body shell.

13. The vehicle according to claim 1, further comprising:

a reverse lift plate pivotally mounted to said air passage proximate said air outlet of said air passage.

14. The vehicle according to claim 5, further comprising a rear wing provided on said body shell to form a rear portion of said air passage.

15. The vehicle according to claim 14, wherein said rear wing slopes upwardly from a point above a rear wheel of the vehicle toward the rear of the vehicle, said rear wing thereby generating a reverse lift during forward motion of the vehicle.

16. The vehicle according to claim 14, wherein a rear portion of said rear wing is pivotally supported to define a rear reverse lift plate.

17. The vehicle according to claim 6, wherein said air passage is substantially covered by said body shell, whereby a guide stay and said reverse lift plate attached thereto are disposed within said air passage and are hidden from view.

18. The vehicle according to claim 1, wherein said body shell comprises a hood and an adjoining side panel, said air passage being located at the front of the vehicle and extending beneath said hood, an air outlet being provided proximate a front door of the vehicle.

19. The vehicle according to claim 18, further comprising a second air outlet formed in said vehicle hood to communicate with an upper surface thereof.

20. The vehicle according to claim 18, further comprising a reverse lift bumper disposed within said air inlet of said air passage, said reverse lift bumper being positioned above a main bumper of the vehicle.

21. The vehicle according to claim 20, further comprising:

a reverse lift member positioned above said reverse lift bumper;

a headlight mounted within said reverse lift member; and a reverse lift plate pivotally secured within a second air outlet of said air passage, said second air outlet being formed in said hood.

22. The vehicle according to claim 21, wherein said reverse lift member has an outer surface formed to be flush with adjacent portions of said body shell.

23. The vehicle according to claim 1, wherein said air passage has a substantially straight longitudinal axis, and said air passage along substantially its entire length defines a non-tortuous passage to facilitate smooth flow of air therethrough.

24. The vehicle according to claim 1, wherein said air passage has side walls formed to curve a corresponding flow path of air flowing therethrough upwardly in the rearward direction with respect to said vehicle, to thereby reduce a lift force on said vehicle during its motion.

* * * * *